United States Patent
Panigrahi et al.

(10) Patent No.: US 11,422,570 B2
(45) Date of Patent: Aug. 23, 2022

(54) SYSTEMS AND METHODS FOR MANAGING A TRANSPORTATION DEVICE FLEET USING TELEOPERATION COMMANDS

(71) Applicant: Ford Global Technologies, LLC, Dearborn, MI (US)

(72) Inventors: Smruti Panigrahi, Farmington Hills, MI (US); Justin Miller, Berkley, MI (US); Timothy Feldkamp, Ann Arbor, MI (US); Sanghyun Hong, Ann Arbor, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 16/552,979

(22) Filed: Aug. 27, 2019

(65) Prior Publication Data
US 2021/0064059 A1    Mar. 4, 2021

(51) Int. Cl.
G05D 1/02    (2020.01)
G05D 1/00    (2006.01)
B62K 3/00    (2006.01)
G06V 20/20    (2022.01)
B62J 43/00    (2020.01)

(52) U.S. Cl.
CPC .......... G05D 1/0295 (2013.01); B62K 3/002 (2013.01); G05D 1/0038 (2013.01); G05D 1/0293 (2013.01); G06V 20/20 (2022.01); B62J 43/00 (2020.02); B62K 2204/00 (2013.01)

(58) Field of Classification Search
CPC .. G05D 1/0295; G05D 1/0038; G05D 1/0293; B62K 3/002; B62K 2204/00; G06K 9/00671; B62J 43/00
See application file for complete search history.

(56) References Cited

U.S. PATENT DOCUMENTS

| | | | |
|---|---|---|---|
| 9,052,710 B1* | 6/2015 | Farwell | B25J 9/1656 |
| 9,132,913 B1* | 9/2015 | Shapiro | G08G 5/0086 |
| 9,429,944 B2 | 8/2016 | Filippov et al. | |
| 9,691,287 B1* | 6/2017 | Shapiro | G08G 5/0091 |
| 11,079,753 B1* | 8/2021 | Roy | G05D 1/0038 |
| 2012/0239224 A1 | 9/2012 | McCabe et al. | |
| 2014/0156133 A1 | 6/2014 | Cullinane et al. | |
| 2015/0346722 A1* | 12/2015 | Herz | G05D 1/0027 701/2 |

(Continued)

FOREIGN PATENT DOCUMENTS

WO    2017/217936 A1    12/2017

OTHER PUBLICATIONS

Berk, B. (Jan. 10, 2019). BMW makes a self-riding motorcycle. We ask, Why? (2 pages). Retrieved from https://www.autoblog.com/2019/01/10/bmw-motorrad-autonomous-balancing-motorcycle-ces/.

(Continued)

*Primary Examiner* — Peter D Nolan
*Assistant Examiner* — Mikko Okechukwu Obioha
(74) *Attorney, Agent, or Firm* — Brandon Hicks; Eversheds Sutherland (US) LLP

(57) ABSTRACT

Systems and methods are provided herein for managing a transportation device fleet using teleoperation. Teleoperation may be beneficial for performing fleet management tasks such as rebalancing, relocation of devices to charging stations, and/or assisting devices operating autonomously that encounter obstacles and are unable to proceed autonomously.

19 Claims, 5 Drawing Sheets

(56) References Cited

U.S. PATENT DOCUMENTS

| | | | |
|---|---|---|---|
| 2016/0300390 A1* | 10/2016 | Malafeew | G16H 20/30 |
| 2016/0306349 A1* | 10/2016 | Lau | G05D 1/0016 |
| 2018/0201152 A1 | 7/2018 | Newman et al. | |
| 2018/0364703 A1* | 12/2018 | Liu | G05D 1/0044 |
| 2018/0365908 A1* | 12/2018 | Liu | G05D 1/0044 |
| 2019/0025819 A1* | 1/2019 | Ferguson | G08G 1/167 |
| 2019/0206258 A1* | 7/2019 | Chang | G01C 21/3664 |
| 2019/0302761 A1* | 10/2019 | Huang | G06F 3/00 |
| 2020/0103980 A1* | 4/2020 | Katz | G06F 3/017 |
| 2020/0192352 A1* | 6/2020 | Rastoll | G01S 17/86 |
| 2020/0254619 A1* | 8/2020 | Grundfest | G05D 1/0038 |
| 2020/0269858 A1* | 8/2020 | Beauvillain | G07C 5/008 |
| 2020/0282980 A1* | 9/2020 | Kinoshita | G06K 9/00791 |
| 2020/0409358 A1* | 12/2020 | Gogna | G05D 1/0088 |
| 2020/0409363 A1* | 12/2020 | Gogna | G05D 1/0011 |
| 2021/0116907 A1* | 4/2021 | Altman | B60W 60/0015 |
| 2021/0142678 A1* | 5/2021 | Chang | G06Q 50/30 |

OTHER PUBLICATIONS

Vozar et al., "Driver modeling for teleoperation with time delay," IFAC Proceedings Volumes, vol. 47, No. 3, pp. 3551-3556, 2014.
Magic Leap One . Retrieved from https://www.magicleap.com/magic-leap-one. Accessed Aug. 27, 2019 (11 pages).

\* cited by examiner

SYSTEMS AND METHODS FOR MANAGING A TRANSPORTATION DEVICE FLEET USING TELEOPERATION COMMANDS

TECHNICAL FIELD

The present disclosure relates to systems and methods for managing a transportation device fleet using teleoperation commands and more particularly to using teleoperation to assist electric vehicles, such as electric scooters ("electric vehicles"), that are unable to continue operation in an autonomous mode.

BACKGROUND

There are various applications for teleoperating electric vehicles such as eScooters. Some examples may include using teleoperation to perform rebalancing (moving eScooters to more optimal locations) the eScooters to optimize flow of the eScooters and reduce down-time, as well as ensuring the eScooters are placed in areas on the sidewalk that do not interfere with pedestrian/bicycle traffic. Teleoperation may also allow a teleoperator to manage and operate multiple eScooters simultaneously, and may allow a teleoperator to intervene and manually operate an eScooter when the eScooter encounters a problem and is unable to autonomously operate. Having a view of the entire geo-fenced area and location of each eScooter in real-time on a computer screen or in an immersive environment may serve to enhance the teleoperation experience. These are merely example benefits of using teleoperation commands for transportation device management, and are not intended to be limiting.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
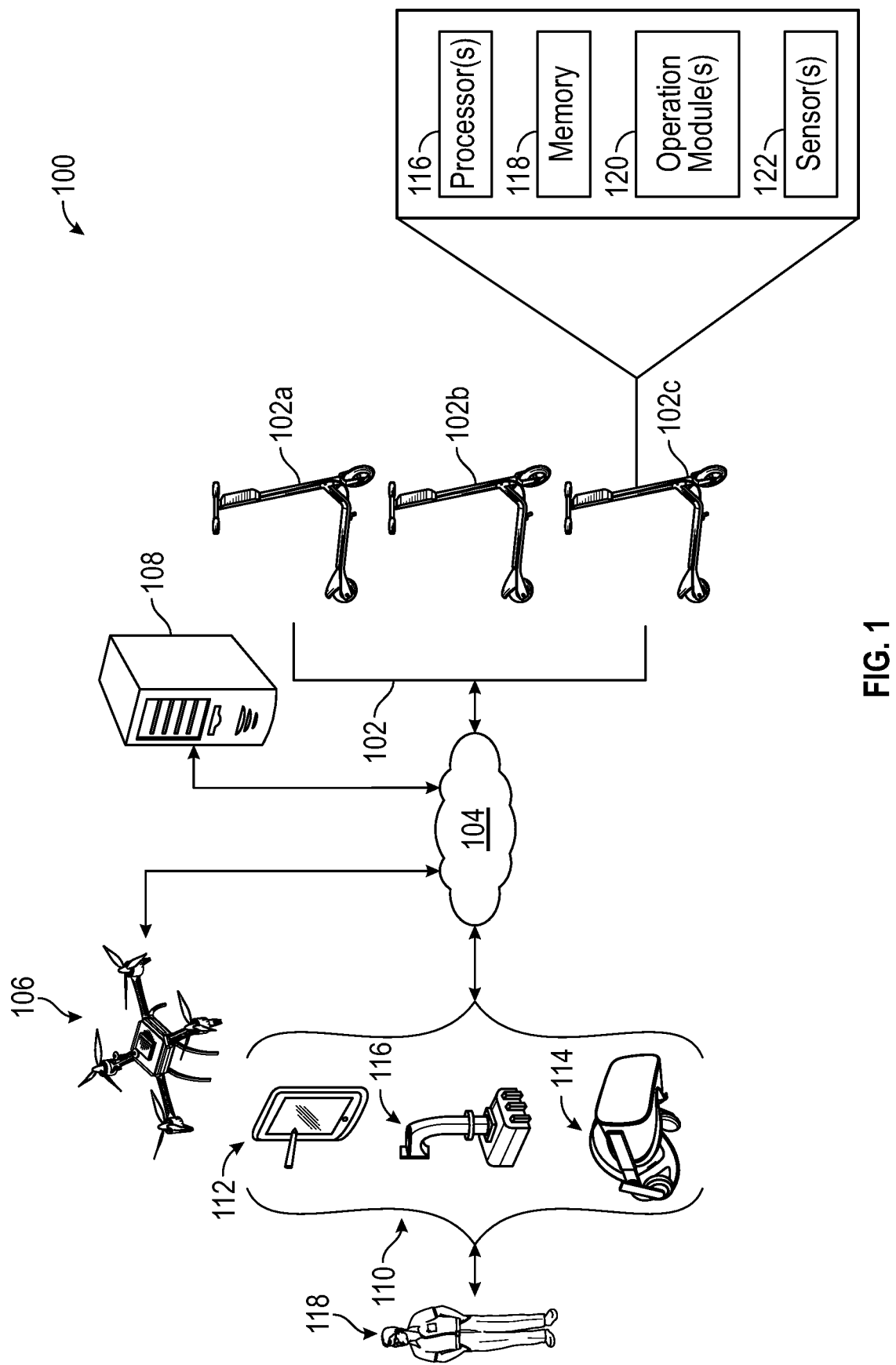
FIG. 1 depicts an illustrative architecture in accordance with one or more example embodiments of the disclosure.

The disclosure is directed to, among other things, systems and methods for managing a transportation device fleet using teleoperation commands. In some embodiments, a transportation device fleet may comprise a fleet of electric vehicles. More specifically, in one example, the fleet of electric vehicles may include a fleet of eScooters (for simplicity any reference made herein to "eScooters" may similarly apply to any other type of transportation device, such as an electric vehicle, autonomous vehicle, robots, etc.). A user, or teleoperator, may be able to establish a teleoperation communication with one or more eScooters of an eScooter fleet in order to provide instructions to the eScooters (for example, command an eScooter to travel to a particular destination, or even perform smaller-scale actions such as moving forward at a particular rate, turning left, etc.). Teleoperation may be defined as an operation that is performed from a remote location, for example the remote control of the eScooters described herein. In some instances, teleoperation may be beneficial in performing eScooter fleet management tasks such as rebalancing (e.g., reorganizing eScooters in optimal locations within a geofence) or directing eScooters to charging stations (both of these tasks, for example, may be depicted in FIG. 2). Teleoperation may also be beneficial in a situation where an eScooter is operating autonomously, but encounters an obstacle it is unable to surpass on its own, and thus requires teleoperation assistance to proceed.

In some embodiments, an indication may be provided to a teleoperator that an eScooter may require teleoperation assistance. For example, such an indication may be provided if the eScooter has been idle for more than a threshold period of time (e.g., five minutes or more) or if the eScooter has less than a threshold amount of battery charge remaining (e.g., 25% battery charge). These indications may serve to notify the teleoperator that the teleoperator needs to provide teleoperation commands to the eScooter to perform an action such as moving the eScooter to a more optimal location, or sending the eScooter to a charging station. In some embodiments, the teleoperator may be automatically connected to the eScooter through a teleoperation communication instead of an indication being sent before the teleoperator decides whether to teleoperate the eScooter.

In some embodiments, teleoperation may involve the use of a human-computer interface (HCI). A HCI may consist of at least two parts: 1) an output device (e.g., a graphical interface) which may present all necessary feedback from the eScooter about the eScooter's state and the state of the environment around the eScooter, and 2) an input device which may be used to issue commands to the eScooter. In some instances, examples of input devices may include gamepads, joysticks, gaming steering wheels, touch screen tablets, or any other device capable of serving to provide input commands to the eScooter. The output device may include graphical interfaces with depth information, such as a user interface location on a tablet, for example. A user immersed in the environment that the eScooter's vision sensors see in the real world may provide a realistic and seamless control experience for the teleoperator. Other examples of input and/or output devices, as well as devices that are capable of serving as both input and output devices, are described further below.

Teleoperation may also be performed using augmented reality (AR). Augmented reality may be defined as superimposing virtual content onto a real world view. One example approach may be based on AR with a touch-panel of a device such as a mobile phone or tablet. This example approach may involve a combination of teleoperation and autonomous navigation, since the teleoperator may be presented with feedback data on a device screen, like in teleoperation, but instead of steering the eScooter itself, the teleoperator may instead provide an input (e.g., destination goals or a whole trajectory path) for the eScooter to complete autonomously. In some embodiments, for example, the teleoperator can hand draw a path to provide the trajectory for the eScooter (for example, as described with reference to FIGS. 4A and 4B).

Virtual reality (VR) may also be used to perform teleoperation. For example, AR may be integrated with an input from a VR headset, which may serve to enhance the control of the eScooter. A signal from the VR headset (which may be equipped with inertial sensors) can be used to feed to the eScooter's control input such that when the teleoperator turns his/her head, for example, the eScooter may perform the corresponding steering action. As another example, when the teleoperator moves his/her head up or down, the eScooter may move forward or brake. The amount or rate of acceleration and braking can also be controlled using the feedback from the VR headset or haptic gloves (e.g., the rate at which the teleoperator moves his/her head up or down may directly correspond to the rate at which the eScooter moves forward or brakes. Additionally, the VR headset may serve to provide the teleoperator with a visual representation of the environment of the eScooter. Such environment may be generated and/or supplemented based on data captured by the eScooter (or any number of eScooters within the fleet) or by any data capture devices or infrastructure within the environment (e.g., traffic cameras, drones, vehicles on the road that are in communication through vehicle-to-vehicle (V2V) or vehicle-to-infrastructure (V2I), etc.).

Mixed reality (MR) may also be used to perform teleoperation. Mixed reality may be defined as a technology that exists between augmented reality and virtual reality where virtual elements are anchored to a real world view. With mixed reality, the teleoperator may use wearable mixed-reality (MR) goggles and haptic gloves. Using MR, the teleoperator may walk through a virtual environment representing the environment of the eScooters, and may interact with the eScooters while walking by them in the virtual environment. In some instances, one such form of interaction may involve the teleoperator providing travel trajectories for the eScooters to follow or a destination location to travel to through the MR headset. When the operator encounters an eScooter in the virtual environment that needs to be sent back to a docking station, he/she may be able to see a virtual avatar of the same eScooter in the MR headset, and may also be able to use his/her eyes movements to provide a trajectory for the eScooter to the docking station (or any other goal location). The eye movements may then be translated into trajectories, which may be then sent to the eScooter via a wireless network (e.g., 5G network). The eScooter may then autonomously follow the indicated trajectory or may travel to the indicated destination location. In some instances, the teleoperator may also use the haptic gloves and the MR headset to take over control of the eScooter and navigate it to the desired goal location, as opposed to the eScooter performing the navigation autonomously.

In some embodiments, the eScooter may switch between multiple modes (for example, autonomous mode and teleoperation mode) while navigating an environment. For example, the eScooter may perform autonomous navigation using onboard sensors such as cameras and ultrasonic sensors. The cameras may be used to detect obstacles that may trigger a scanning mode in which the eScooter scans its environment to determine whether to continue in autonomous mode, or transition to a teleoperation mode. If the eScooter transitions to teleoperation mode, the teleoperator may be notified, and subsequently may take control of the eScooter. As the teleoperator may also be observing the environment through the eScooter's sensors as it navigates, the teleoperator can also change the trajectory at any point in order to provide new trajectory to avoid collisions with humans or the environment.

In some embodiments, any of the operations described herein, such as rebalancing, may be performed on multiple eScooters at the same time. For example, a teleoperator may select, or otherwise command, multiple eScooters to travel to one or more particular destinations. In some instances, the teleoperator may also choose between an optimal distance and/or an optimal travel time for each of the eScooters. A destination location may be sent to each of the eScooters, for example in the form of GPS coordinates. A route may be sent to each of the eScooters, and each of the eScooters may autonomously navigate to the one or more destination locations. The teleoperator may also manually intervene and provide teleoperation commands to one or more of the eScooters. For example, one or more of the eScooters may become stuck at an obstacle, may indicate as such to the teleoperator, and the teleoperator may provide commands to assist the eScooter.

Connection considerations such as latency may be taken into account when determining whether what type of teleoperation systems should be used and/or if teleoperation is even appropriate over autonomous navigation. For example if it is determined that a high latency connection exists, it would be more beneficial for the eScooter to operate autonomously, as teleoperation commands would experience lag in reaching the eScooter. In some instances, all sensor data and robot commands may be timestamped, and latency may be measured as time difference between the time the command is received by the eScooter and the time indicated in the timestamped data.

ILLUSTRATIVE EMBODIMENTS

Turning now to the drawings, FIG. 1 depicts an illustrative architecture 100 in which techniques and structures of the present disclosure may be implemented. The illustrative architecture 100 may include a transportation device fleet network 102 comprising a plurality of transportation devices 102(a), 102(b), and 102(c). In some embodiments, the transportation device fleet network may comprise an eScooter fleet network and may include eScooters (e.g., which may be 102(a), 102(b), and 102(c)) a communications network 104, one or more drones 106, a server 108, and one or more teleoperation devices 110, including, for example, an application device 112, virtual reality and/or mixed reality equipment 114, and/or a joystick 116 (or similar physical control device), all of which may be operated by a user 118 (e.g., a teleoeprator). In some embodiments, the eScooter fleet network 102 may comprise any other type of transportation device, such as an autonomous vehicle, eBike, etc.

In some embodiments, the communications network 104 may include any one or a combination of multiple different types of networks, such as cable networks, the Internet, wireless networks, and other private and/or public networks. In some instances, the communications network 104 may include cellular (e.g., 5G), Wi-Fi, or Wi-Fi direct. In some embodiments, the network may involve communications between eScooters in the network and/or between eScooters in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used.

An eScooter (for example, eScooter 102(a)) may comprise at least one or more processor(s) 116, memory 118, one or more operation module(s) 120, and one or more sensors 122. In some embodiments, the functionality of the module(s) described herein (for example, the operation module(s) 120) may also be implemented as a single module or any other number of module(s). Any descriptions herein made with reference to eScooter 102(a) may similarly apply to any other eScooters, such as, for example, eScooters 102(b) or 102(c).

The eScooter 102(a) may include one or more processors 116 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 118 as needed for execution. The processor 116 may be configured to execute the computer-executable instructions to cause various operations to be performed. Each processor 116 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 118 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 118 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The operation module(s) 120 may perform operations including at least receiving one or more status inputs from a first eScooter of one or more eScooters, and establishing, based on the one or more status inputs, a teleoperation communication between the first eScooter and one or more teleoperation systems. The operation module 120 may also be capable of performing any of the operations or functionalities described herein.

The sensors 122 may include any sensors for capturing data in the environment of the eScooter 102(a), including, for example, audio sensors, video sensors, accelerometers, gyroscopes, temperature sensors, proximity sensors, LIDAR, etc. The information captured by the sensors 122 may be used in a number of different ways. For example, the sensor information may be used by the eScooter 102(a) itself to perform autonomous navigation of an environment. The sensor information may be transmitted to a remote user or teleoperator and may assist the teleoperator in teleoperation of the eScooter 102(a) (for example, video feed of the perspective of the eScooter 102(a) may be provided to assist the teleoperator in navigating the eScooter 102(a) through teleoperation commands) Similarly, the sensor information may be transmitted to any of the teleoperation devices 110 (for example, the sensor information may be used to assist in creating the virtual environment of the eScooter 102(a) through the virtual reality and/or mixed reality equipment 114. The sensor information may also be used to provide an indication that the eScooter 102(a) requires teleoperation. For example, if the eScooter 102(a) has been idle for more than a threshold period of time, or if the eScooter 102(a) has less than a threshold battery charge and needs to be navigated to a charging station.

In some embodiments, a drone 106 may refer to an airborne device. A drone may serve to supplement the sensory data captured by the eScooter 102(a). In some instances, the drone may follow the eScooter 102(a) and capture data about the environment surrounding the eScooter 102(a). For example, the drone may provide an aerial video feed of the eScooter 102(a). An individual drone may be assigned to a particular eScooter 102(a), may be assigned to multiple eScooters 102(a), or may be assigned to a particular geofence or geographical area, as examples.

The server 108 may act as a remote cloud platform for performing any of the functionality described herein, such as the operations with respect to an eScooter (e.g., 102(a)) of the eScooter fleet. The server 108 may include a single computing device or a number of computing devices distributed over a network.

The teleoperation devices 110 may allow a user 118, such as a teleoperator, to provide teleoperation commands to an eScooter 102(a). For example, a teleoperation command may include an instruction for the eScooter 102(a) to travel forwards or backwards, make a turn, stop, follow a particular path of travel, or any other operation the eScooter 102(a) is capable of performing.

In some embodiments, a teleoperation device 110 may include an application device 112. An application device 112 may include any form of computer-implemented application used to provide teleoperation commands to an eScooter 102(a) (for example, a desktop computer, laptop, tablet, or the like). The application device 112 may also implement augmented reality features to assist the teleoperator in performing teleoperation functions on an eScooter 102(a). For example, the application device 112 may overlay information on the user interface. In some instances, the application device 112 may include a similar interface to the interfaces described with reference to FIGS. 4A and 4B.

In some embodiments, a teleoperation device 110 may include virtual reality and/or mixed reality equipment 114. A virtual reality and/or mixed reality equipment may include, for example, a virtual reality headset and/or other virtual reality equipment. The virtual reality and/or mixed reality equipment 114 may supplement the augmented reality of the application device 114 by allowing the teleoperator to interact with a virtual environment representing the real environment of an eScooter 102(a). The teleoperator, by wearing the virtual reality and/or mixed reality equipment 114, may be able to view video and/or audio feed of the eScooter 102(a) (for example, from the perspective of the eScooter 102(a) and/or drone) or any other device in the environment of the eScooter 102(a) and may also be able to provide commands through the virtual reality and/or mixed reality equipment 114. In some instances, the user may provide commands to the eScooter 102(a) through physical movements. As one example, a user may be able to tilt their head forward and backward to move the eScooter 102(a) forward and backward, and move their head to the left or right to turn the eScooter 102(a). As another example, the user may be able to use hand gestures to provide the eScooter 102(a) with commands. In some instances, a rate at which the eScooter 102(a) is to perform the command may also be determined by the virtual reality and/or mixed reality equipment 114. For example, the rate at which the user moves their head forward may directly correspond to the speed at which the eScooter 102(a) travels forward. As another example, the angle of the user's head may indicate the intended speed of the eScooter 102(a).

In some embodiments, a teleoperation device 110 may include a joystick 116 or similar analog or other device for controlling an eScooter 102(a). The joystick 116 or like device may be used to provide teleoperation commands to the eScooter 102(a) in a similar manner to the virtual reality and/or mixed reality equipment 114, but instead of the user moving parts of their body to indicate movement instructions for the eScooter 102(a), the user instead interacts with the joystick 116 to provide movement instructions. For example, moving the joystick 116 forward may instruct the eScooter 102(a) to travel forward as well. The joystick 116 may also be used in combination with the virtual reality and/or mixed reality equipment 114 or any other teleoperation device 110.

Figure 2:
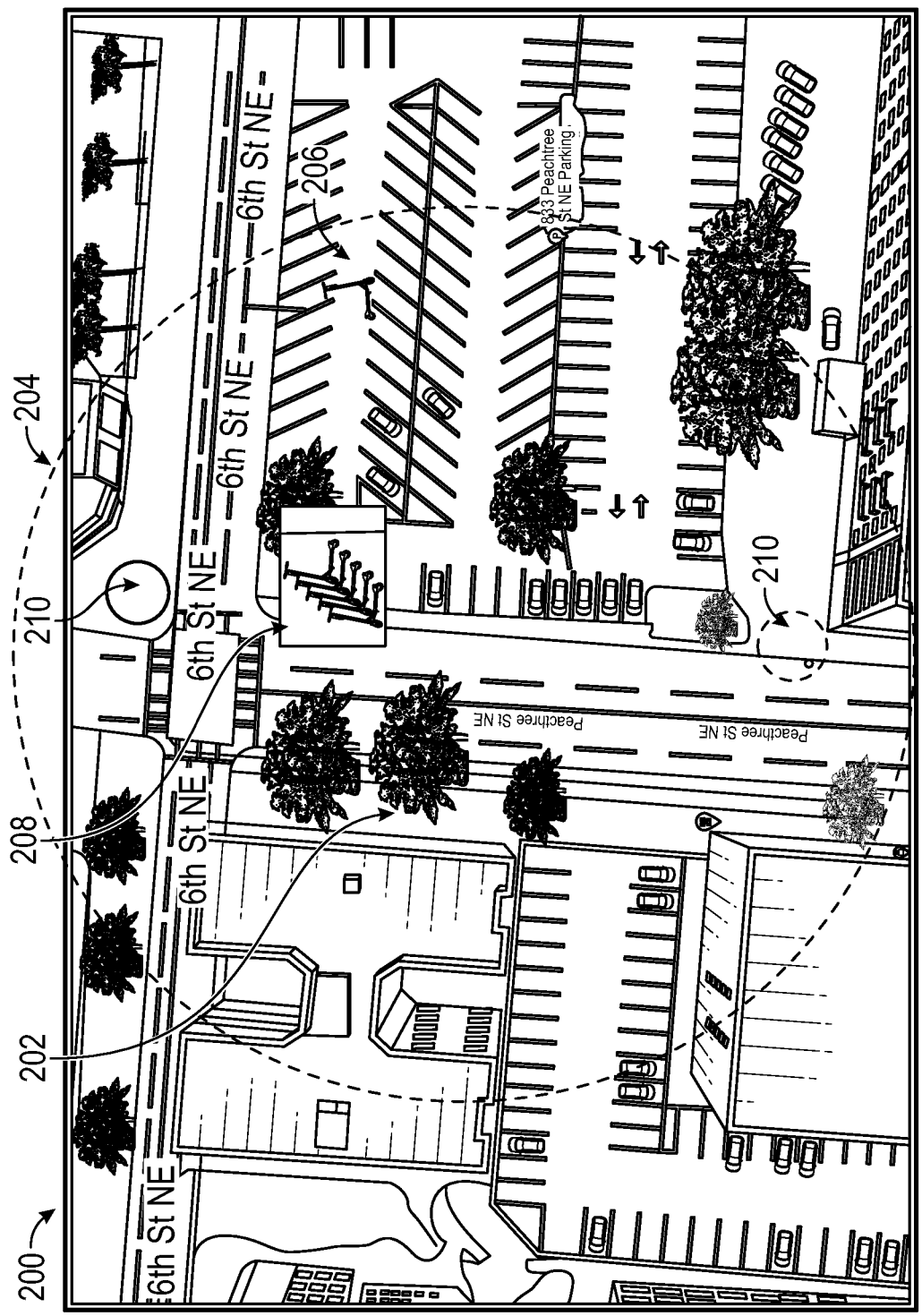
FIG. 2 depicts an example environment of a transportation device in accordance with one or more example embodiments of the disclosure.

FIG. 2 depicts an example environment 200 of an eScooter 206 that includes a geofence environment 202. The eScooter 206 may be the same as any of eScooters 102(a), 102(b), 102(c), or any other eScooter in the eScooter fleet 102. The geofence environment 202 may be described as the geographical area in which the eScooter 206 is allowed to traverse. The geofence environment 202 may be defined by a boundary line 204, where the geofence environment 202 is contained within the boundary line 204. The geofence environment 202 may include one or more eScooter charging stations 208, to which the eScooter 206 may autonomously travel, or to which the eScooter 206 may travel based on commands from a teleoperator. The geofence environment 202 may also include one or more optimal locations 210 for an eScooter 206 to travel to during a rebalancing operation. For example, the optimal locations 210 may include areas that experience a larger volume of pedestrian foot traffic, and thus would be more likely to result in a user riding the eScooter 206.

Figure 3:
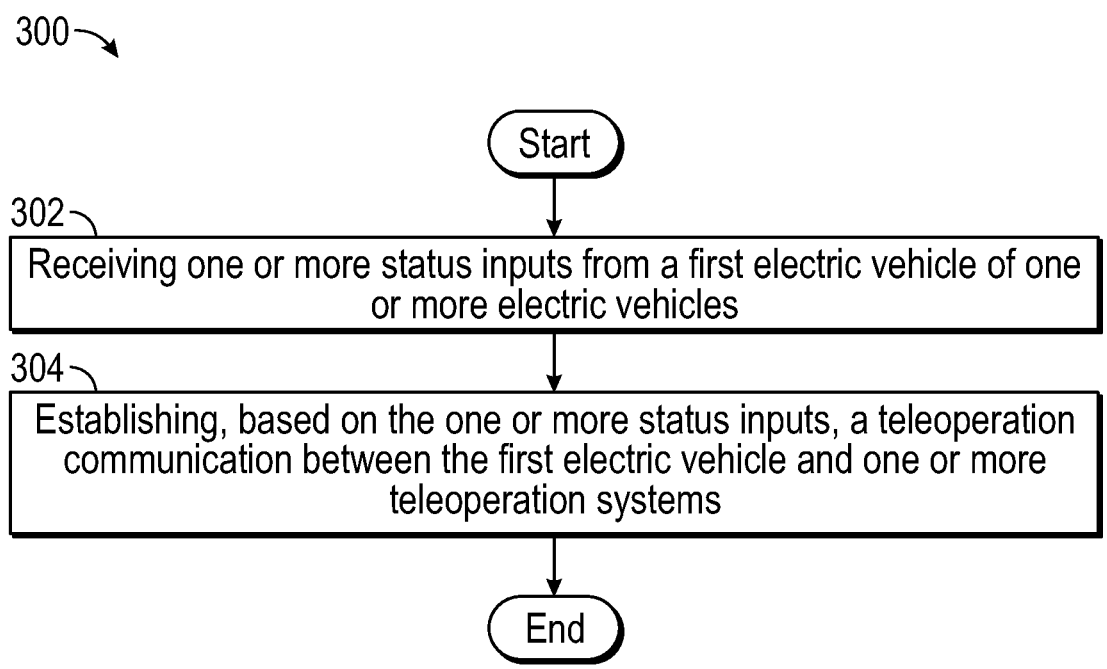
FIG. 3 depicts a flowchart of an example method in accordance with one or more example embodiments of the disclosure.

FIG. 3 is a flowchart of an example method of the present disclosure. In some embodiments, the method includes an operation 302 of receiving one or more status inputs from a first eScooter of the one or more eScooters.

In some embodiments, the method includes an operation 304 of establishing, based on the one or more status inputs, a teleoperation communication between the first eScooter and the one or more teleoperation systems.

Figure 4A:
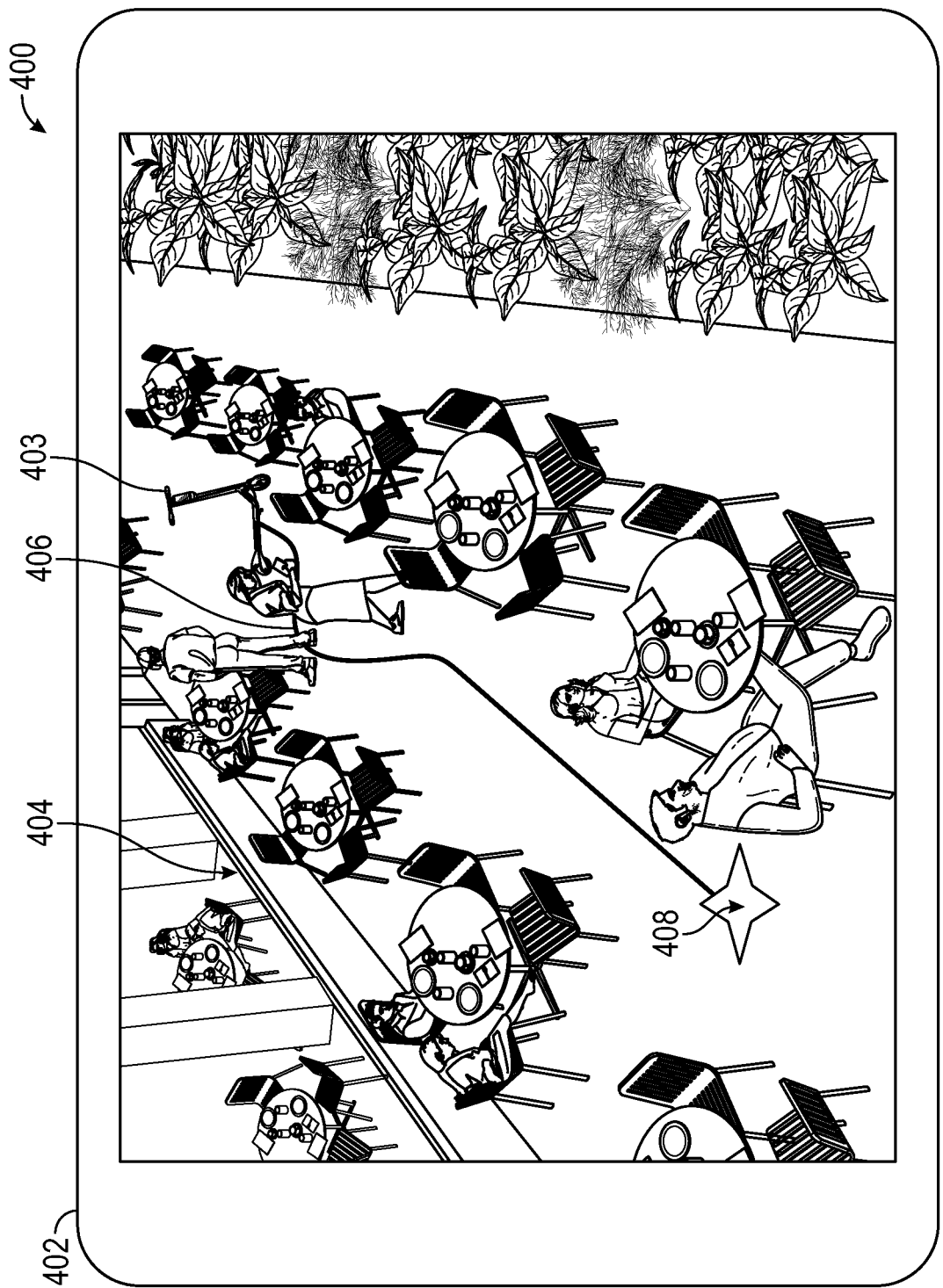
FIG. 4A depicts an example teleoperation user interface in accordance with one or more example embodiments of the disclosure.

FIG. 4A depicts an example teleoperation user interface 400. The example teleoperation user interface 400 may be presented on a user mobile device 402 (for example, the application device 112) and may display a street view of an environment surrounding the eScooter 403 (which may be the same as eScooter 102(a)). The teleoperation user interface may allow a user (for example, a teleoperator) to control the movement of the eScooter 403 by drawing a travel path 406 on the teleoperation user interface 400 for the eScooter 403 to follow. The eScooter 403 may then follow the travel path to a destination location 408. The eScooter 403 may perform these operations in an autonomous mode without further user input. If the eScooter 403 begins to travel to the destination location 408 and determines that it had encountered an obstacle that it is unable to surmount autonomously, an indication may be sent to the user, and the user may provide teleoperation commands to assist the eScooter 403 in reaching the destination location 408.

Figure 4B:
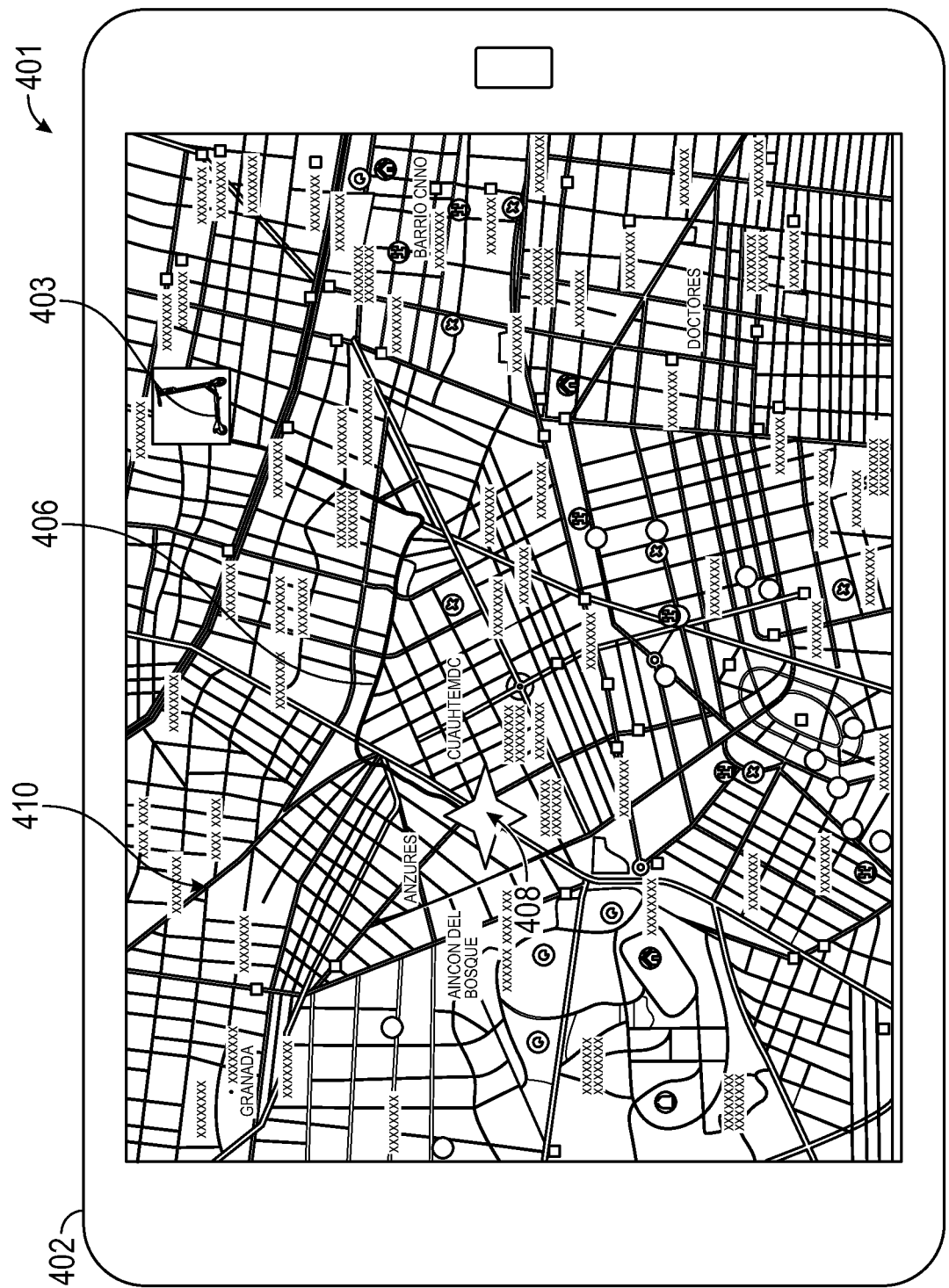
FIG. 4B depicts an example teleoperation user interface in accordance with one or more example embodiments of the disclosure.

FIG. 4B depicts a second example of a teleoperation user interface 401. This second example may be similar to the first example of FIG. 4A, but may differ in the respect that a map view is displayed rather than a street view. The user may still draw a travel path 406 for the eScooter 403 (which may be the same as eScooter 102(a)), but the travel path 406 may instead be drawn with reference to the roads and other features displayed on the map. In either of the examples described in FIGS. 4A and 4B, the user may be able to view information pertaining to the current location of the eScooter 403, which may be visually displayed in the example user interfaces 400 or 401. The user may also be able to track the progress of the eScooter 403 through video, audio, and other data streams received from the eScooter 403 itself, a flying drone associated with the eScooter 403, and/or any data capture elements located in the environment of the eScooter 403, such as a traffic camera.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   one or more electric scooters comprising at least one sensor;
   a processor; and
   memory storing computer-executable instructions, that when executed by the processor, cause the processor to:
   receive one or more status inputs from a first electric scooter vehicle of one or more electric scooters;
   establish, based on the one or more status inputs, a teleoperation communication between the first electric scooter and a virtual reality headset;
   receive, in a teleoperation communication, a control command, wherein the control command comprises an indication of a head motion made by a teleoperator using the virtual reality headset, the head motion indicating a direction of travel for the first electric scooter;
   determine a rate of speed for the first electric scooter based on a rate of speed of the head motion made by a teleoperator using the virtual reality headset; and
   send an instruction to cause the electric scooter to follow the direction of travel.

2. The system of claim 1, wherein the first electric scooter is configured to operate in an autonomous mode, and wherein a first input of the one or more status inputs from the first electric scooter comprises an indication that the first electric scooter requires teleoperation assistance through the virtual reality headset.

3. The system of claim 1, further comprising one or more drones, wherein a first drone of the one or more drones is configured to provide a video feed corresponding to a location of the first electric scooter.

4. The system of claim 1, wherein a first input of the one or more status inputs from the first electric scooter comprises an indication of an idle time of the first electric scooter being above an idle time threshold.

5. The system of claim 1, wherein the computer-executable instructions further cause the processor to:
   receive an indication of a destination location for the first electric scooter to travel; and
   instruct the first electric scooter to travel to the destination location in an autonomous mode.

6. The system of claim 5, wherein the computer-executable instructions further cause the processor to:
   receive, from the first electric scooter, an indication that the first electric scooter is currently unable to proceed in autonomous mode; and
   send the indication that the first electric scooter is currently unable to proceed in autonomous mode;
   receive an indication that a second teleoperation communication is to be established between the first electric scooter and the virtual reality headset; and
   establish the second teleoperation communication between the first electric scooter and the virtual reality headset.

7. The system of claim 1, wherein the computer-executable instructions further cause the processor to:
   determine that a latency value of the teleoperation communication drops below a latency threshold; and
   send an indication for the first electric scooter to operate in an autonomous mode.

8. The system of claim 1, wherein the control command is a first control command, wherein head motion comprises a forward or backward movement of the virtual reality headset, and wherein the computer-executable instructions further cause the processor to:
   receive, in a second teleoperation communication, a second control command, wherein the second control command comprises an indication of a second head motion made by a teleoperator using the virtual reality headset, the second head motion comprising a left or right head turn by the teleoperator using the virtual reality headset; and
   send a second instruction to cause the first electric scooter to turn in a direction indication by the second head motion.

9. An electric vehicle management method comprising:
   receiving one or more status inputs from a first electric scooter of one or more electric scooters;
   establishing, based on the one or more status inputs, a teleoperation communication between the first electric scooter and a mixed reality teleoperation system comprising mixed reality goggles;
   receiving, in a teleoperation communication, a control command, wherein the control command comprises an indication of an eye movement made by a teleoperator using the mixed reality goggles, the eye movement indicating a direction of travel for the first electric scooter;
   determining a trajectory for the first electric scooter based on the eye movement made by the teleoperator using the mixed reality goggles; and
   sending an instruction to cause the electric scooter to follow the control command.

10. The method of claim 9, wherein the first electric scooter is operating in an autonomous mode, and wherein a first input of the one or more status inputs from the first electric scooter comprises an indication that the first electric scooter requires teleoperation assistance through the mixed reality teleoperation system.

11. The method of claim 9, wherein a first input of the one or more status inputs from the first electric scooter comprises an indication of a battery charge of the first electric scooter being below a battery charge threshold.

12. The method of claim 9, further comprising:
receiving an indication of a destination location for the first electric scooter to travel to; and
instructing the first electric scooter to travel to the destination location in an autonomous mode.

13. The method of claim 12, further comprising:
receiving, from the first electric scooter, an indication that the first electric scooter is currently unable to proceed in autonomous mode; and
sending the indication that the first electric scooter is currently unable to proceed in autonomous mode;
receiving an indication that a second teleoperation communication is to be established between the first electric scooter and the mixed reality teleoperation system; and
establishing the second teleoperation communication between the first electric scooter and the or mixed reality teleoperation system.

14. The method of claim 13, further comprising:
receiving, in the second teleoperation communication, an indication of a travel path for the first electric scooter to follow, wherein the indication is in a form of a path line drawn through a device application; and
sending an instruction to cause the first electric scooter to follow the travel path.

15. The method of claim 9, further comprising:
determining that a latency value of the teleoperation communication drops below a latency threshold.

16. The method of claim 9, wherein the mixed reality teleoperation system comprises a virtual reality system, and wherein the eye movement further comprises a head turn to indicate to the first electric scooter to make a turn.

17. The method of claim 9, wherein the mixed reality teleoperation system comprises a virtual reality system, and wherein the eye movement further comprises an up or down head movement.

18. The method of claim 9, further comprising:
causing to present, through the mixed reality goggles, a virtual environment to the teleoperator, the virtual environment including a virtual representation of the first electric scooter vehicle; and
providing, through the virtual environment, a travel trajectory for the first electric scooter.

19. A system comprising:
an electric scooter;
one or more teleoperation systems;
at least one processor; and
at least one memory storing computer-executable instructions, that when executed by the at least one processor, cause the at least one processor to:
receive one or more status inputs from the electric scooter;
establish, based on the one or more status inputs, a teleoperation communication between the electric scooter and the one or more teleoperation systems; and
receive, in a teleoperation communication, a control command, wherein the control command comprises an indication of an eye movement made by a teleoperator using mixed reality goggles of the one or more teleoperation systems, the eye movement indicating a direction of travel for the electric scooter;
determine a trajectory for the electric scooter based on the eye movement made by the teleoperator using the mixed reality goggles; and
send an instruction to cause the electric scooter to follow the control command.

* * * * *